(12) United States Patent
Scott

(10) Patent No.: US 11,034,572 B2
(45) Date of Patent: Jun. 15, 2021

(54) SYSTEM AND METHOD FOR VEHICLE TANK REFILLING

(71) Applicant: Komatsu America Corp., Rolling Meadows, IL (US)

(72) Inventor: David J. Scott, Washington, IL (US)

(73) Assignee: Komatsu America Corp., Rolling Meadows, IL (US)

(*) Notice: Subject to any disclaimer, the term of this patent is extended or adjusted under 35 U.S.C. 154(b) by 3 days.

(21) Appl. No.: 16/544,292

(22) Filed: Aug. 19, 2019

(65) Prior Publication Data

US 2021/0054969 A1 Feb. 25, 2021

(51) Int. Cl.
*B67D 7/30* (2010.01)
*B67D 7/08* (2010.01)
*B60S 5/02* (2006.01)
*B67D 7/04* (2010.01)

(52) U.S. Cl.
CPC .............. *B67D 7/302* (2013.01); *B60S 5/02* (2013.01); *B67D 7/04* (2013.01); *B67D 7/08* (2013.01)

(58) Field of Classification Search
CPC ... B67D 7/04; B67D 7/08; B67D 7/30; B67D 7/302; B60S 5/02
See application file for complete search history.

(56) References Cited

U.S. PATENT DOCUMENTS

| | | | |
|---|---|---|---|
| 3,650,303 A * | 3/1972 | Chambers | B60P 3/14 141/1 |
| 6,484,088 B1 | 11/2002 | Reimer | |
| 7,347,191 B2 | 3/2008 | Atwood et al. | |
| 7,469,725 B2 * | 12/2008 | Annati | B60K 15/00 137/426 |
| 8,538,591 B1 | 9/2013 | Klughart | |
| 9,658,077 B2 * | 5/2017 | Wu | B67D 7/221 |
| 10,549,979 B2 * | 2/2020 | Furmanczyk | B60K 15/03006 |
| 2017/0190564 A1 | 7/2017 | Furmanczyk et al. | |
| 2017/0282906 A1 | 10/2017 | Abe et al. | |

* cited by examiner

*Primary Examiner* — Nicolas A Arnett
(74) *Attorney, Agent, or Firm* — Brinks Gilson & Lione

(57) ABSTRACT

A vehicle or machine may include a consumable that requires refilling, such as fuel. Refilling the consumable may occur at a regular interval and the amounts may be recorded. Based on the past intervals and amounts, there may be modifications to future amounts. The weight of the consumable on a vehicle may decrease efficiency. Accordingly, the amount of consumable should be kept to a minimum to avoid carrying excess weight. Reducing an amount of the consumable upon replenishment can improve efficiency of the vehicle.

12 Claims, 9 Drawing Sheets

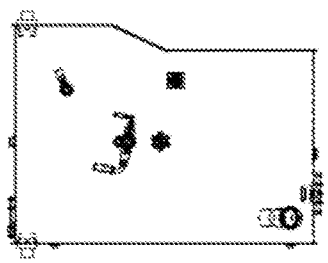
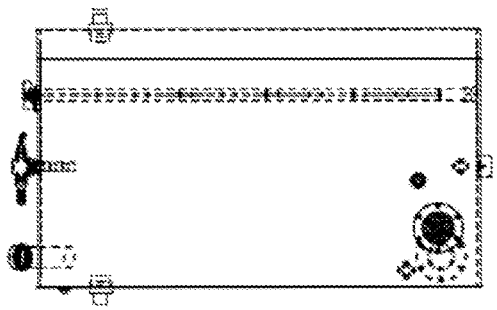
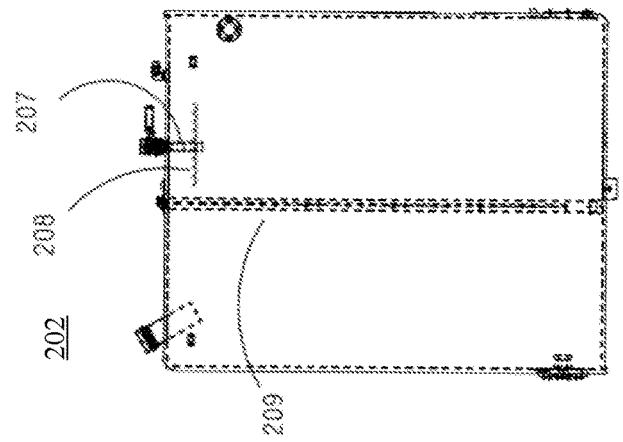
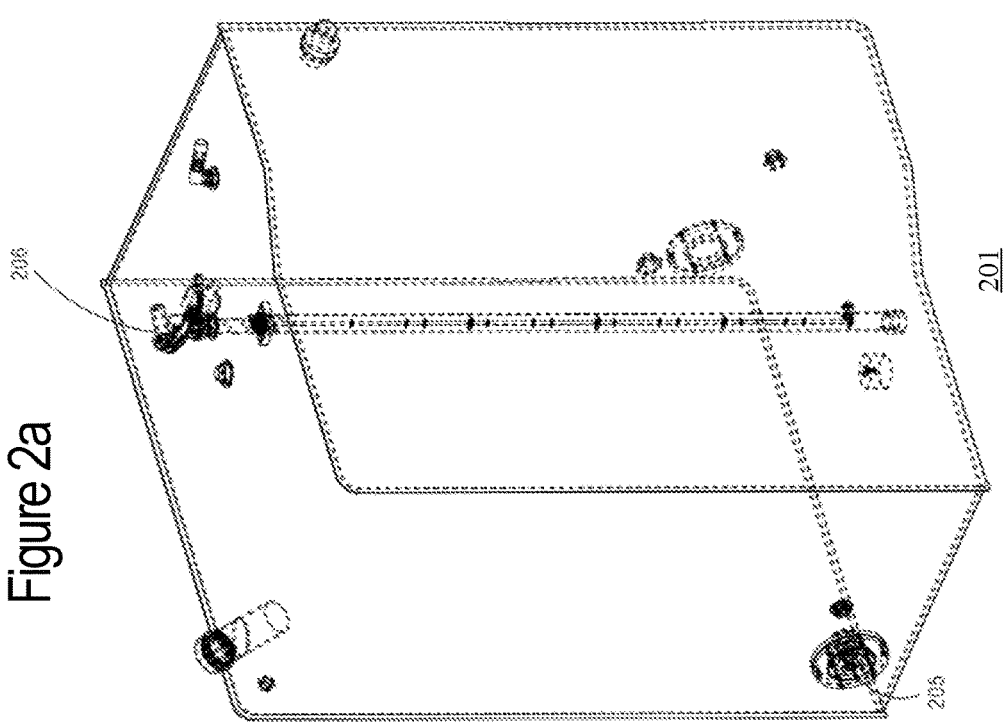

SYSTEM AND METHOD FOR VEHICLE TANK REFILLING

TECHNICAL FIELD

The present disclosure relates to refilling of a tank that includes controlling of the refill quantity of required consumables with the normal usage of a vehicle or machine. Consumables on a vehicle which require refill maintenance based on usage include fuels, exhaust system treatment fluids as well as application specific vehicles such as sprayer systems mounted with on board tank reservoirs, road maintenance oil applicator systems with on board tank reservoirs, materials haulage trucks such as tanker trucks, tray dump trucks, and such similar specific function vehicles.

BACKGROUND

Operation of vehicles or machines may require that a consumable, such as fuel, be replenished from time to time depending on the work cycle energy requirements. An example vehicle is a diesel engine powered off-highway large dump trucks used in surface mining operations. The more fuel on the dump truck, the less fuel efficiency the dump truck will have. Specifically, the increased weight of fuel that the dump truck has to haul will result in increased fuel usage or a decrease in fuel efficiency or fuel usage rate. In other words, unused extra reserve fuel and its associated weight increases the energy requirements for the truck movement, which in turn results in additional fuel expended for the energy required to haul this extra reserve fuel amount. This results in more fuel per haulage amount of material than would be afforded were the extra fuel amount not present.

The fuel usage rate may also be affected by the environment in which the vehicle is operating. One example environment may be in a deep mining pit, which contains a start point loading location at a low elevation pit area to the dumping point at a significantly higher elevation and significantly long distance. Such an environment may require more usage of fuel per hour than a haulage cycle, which has little elevation change from the loading start point to the dump point and/or has short distance traveled. For those two example environments, the refill amounts of fuel for a fixed amount of time are much different. Because of this varied amount of fuel usage rate, the manufacturer for vehicles, such as the large dump truck example, may provide a capacity sized reservoir which will meet the worse case, highest fuel usage per time utilization. This worst case is designed to ensure that enough fuel is present, but does not improve fuel usage rate efficiency.

Local mine site procedures can influence the amount of reserve fuel carried. The refill time interval from mine site to mine site is variable, as well as can be variable on unique schedules at each site. For example, a mine site operation may have a single refuel event time per day. Alternatively, there may be a refueling interval of 2-3 times per day. The lesser the time between maximum capacity reservoir refills results in more reserve fuel carried in the tank. There is a need for a refill system or process to provide an optimum reserve amount refill, which can reduce excessive carriage of reserve amounts of the consumable material or liquid.

SUMMARY

A vehicle or machine may include a consumable that requires refilling, such as fuel. Refilling the consumable may occur at a regular interval and the amounts may be recorded. Based on the past intervals and amounts, there may be modifications to future amounts. The weight of the consumable on a vehicle may decrease efficiency, which leads to a desire to avoid carrying that excess weight by reducing an amount of the consumable. Consumables on a vehicle which requires refill maintenance based on usage include fuels, exhaust system treatment fluids as well as application specific vehicles such as sprayer systems mounted with on board tank reservoirs, road maintenance oil applicator systems with on board tank reservoirs, materials haulage trucks such as tanker trucks, tray dump trucks, and such similar specific function vehicles. The refilling of the consumable may be necessary for continued operation. There is a balance to maintaining a sufficient amount of the consumable for operation while improving vehicle efficiency by minimizing the amount of the consumable carried to reduce its weight.

In one embodiment, a method for adjusting a replenishment of a consumable to a vehicle may include recording past amounts for the replenishment of the consumable, determining an optimal replenishment amount based on the recorded past amounts, comparing a current replenishment amount with the optimal replenishment amount, comparing, when the current replenishment amount is different from the optimal replenishment amount, the current replenishment amount with the recorded past amounts, adjusting the optimal replenishment amount when the current replenishment amount matches at least one of the recorded past amounts, and recording the current replenishment amount without adjustment to the optimal replenishment amount when the current replenishment amount matches the optimal replenishment amount. The method may further include maintaining a counter for the recorded past amounts, wherein the adjusting is performed with the counter is above a minimum number of iterations. The minimum number of iterations may include three recorded past amounts. The method may further include adjusting a current replenishment amount for the consumable based on the comparison. The consumable may include fuel and the replenishment may include refueling. The vehicle includes a fuel reservoir that is replenished. The optimal replenishment amount is less than a maximum amount of fuel that the reservoir can hold. The reservoir includes a diesel fuel tank, the vehicle includes a mining haulage dump truck, and replenishment includes an automated fill level shutoff device. The reservoir includes a diesel emissions fluid (DEF) tank, the vehicle includes a mining haulage dump truck, and replenishment includes an automated fill level shutoff device. The method further includes setting the optimal replenishment amount based on a fuel usage profile of the vehicle.

In another embodiment, a vehicle with a refueling system includes a fuel reservoir for storing fuel to be used by the vehicle, includes an auto shutoff valve coupled with the fuel reservoir for controlling a refuel amount provided to the fuel reservoir, and includes a controller configured to control the refuel amount by comparing a current refuel level with an optimal refuel level, wherein the optimal refuel level is reset to the current refuel level when the current refuel level is different from the optimal refuel level and when the current refuel level is similar to a minimum number of past refuel levels. The controller is further configured to record the current refuel level in a log without resetting the optimal refuel level when the current refuel level is similar to the optimal refuel level. The log stores the past refuel levels. The controller is further configured to establish the optimal refuel level based on a fuel usage profile of the vehicle. The vehicle further includes an automated fill level shutoff device. The fuel reservoir includes a diesel fuel tank, the vehicle includes a mining haulage dump truck, and the automated fill level shutoff device establishes the refuel level based on instructions received from the controller. The optimal refuel level comprises one of a selection of fixed finite number of levels available. The optimal refuel level maintains at least a minimum level of fuel for the fuel reservoir.

In another embodiment, a method for adjusting a replenishment volume of material to a vehicle includes determining a volume of at least one previous replenishment, determining an optimal reservoir volume that corresponds to the at least one of the previous replenishments, initiating automatic control of the vehicle reservoir to adjust a current replenishment volume, and adjusting the optimal reservoir volume based on a comparison of the current replenishment volume with the optimal reservoir volume and a comparison with the previous replenishment volumes. The material includes fuel.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

FIG. 2a illustrates a front view of an example fuel tank reservoir.

FIG. 2b illustrates an example tank reservoir front view.

FIG. 2c illustrates an example tank reservoir side view.

FIG. 2d illustrates an example tank reservoir top view.

DETAILED DESCRIPTION OF THE DRAWINGS AND THE PRESENTLY PREFERRED EMBODIMENTS

Figure 1:
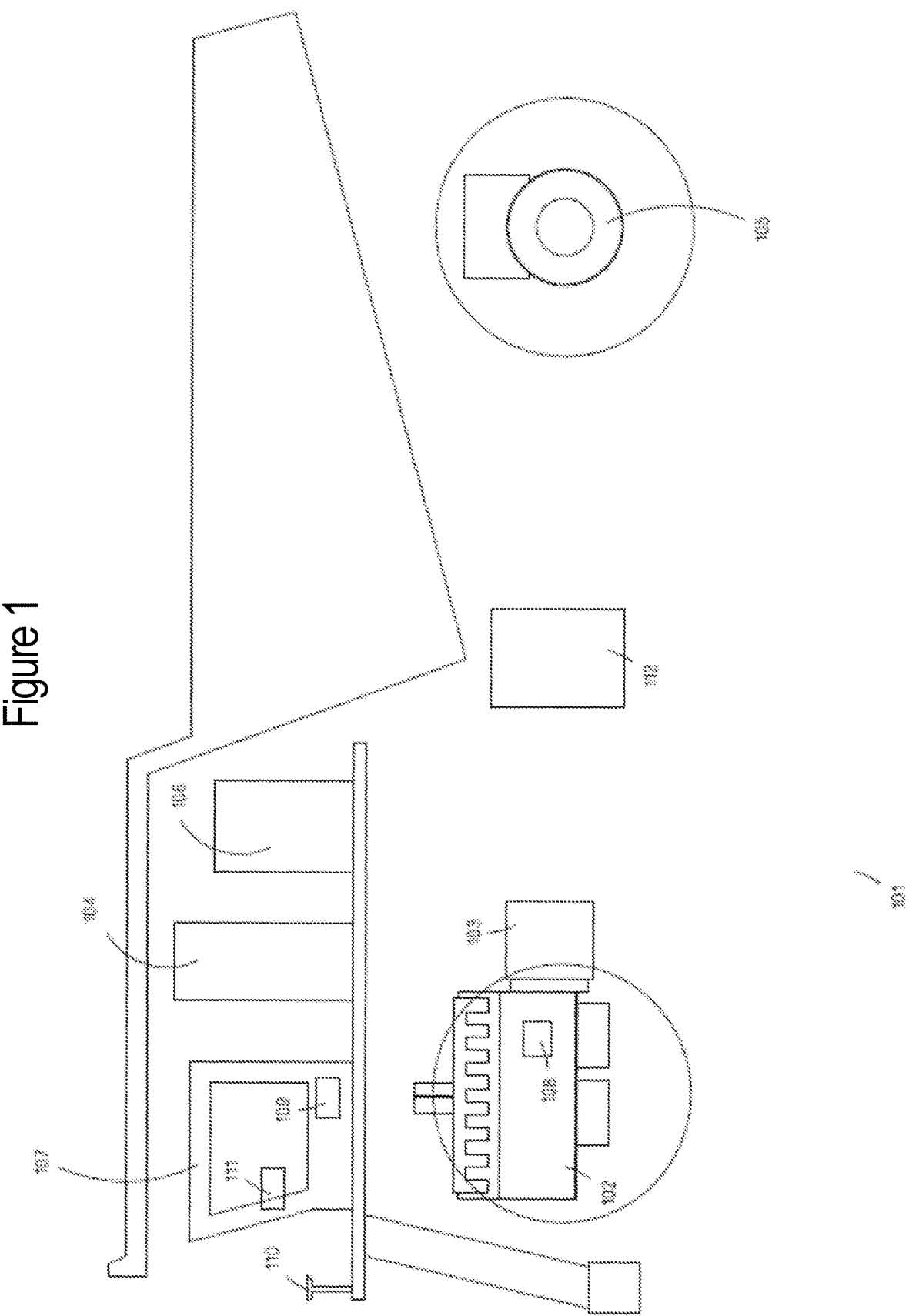
FIG. 1 is an example vehicle for refueling.

Reference will now be made in detail to exemplary embodiments of the invention, examples of which are illustrated in the accompanying drawings. When appropriate, the same reference numbers are used throughout the drawings to refer to the same or like parts. The numerous innovative teachings of the present application will be described with particular reference to presently preferred embodiments (by way of example, and not of limitation). The present application describes several inventions, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

By way of introduction, the disclosed embodiments relate to systems and methods for optimizing the refilling of a consumable in a vehicle or machine. Although the examples described herein relate to a vehicle (such as a large dump truck), that is merely one example and the optimization may apply to other machines or various types of vehicles. Likewise, the examples described herein relate to fuel as the consumable that is being refilled. However, fuel is merely one example of a consumable that is refilled and that results in extra weight for the vehicle or machine and increases the fuel usage rate.

The fuel reservoir may include an amount of fuel that is designed to be used (i.e. utilization amount) along with a margin level, which is an amount of fuel that is present for emergencies and as a safety mechanism to ensure that the vehicle does not run out of fuel. Fuel usage may be based on volume, weight, or time. The volume or weight of the fuel may be the actual amount of fuel in the tank. The time may be an approximate runtime of the vehicle based on the current fuel. In other words, the vehicle may have ten hours of fuel based on the approximate fuel usage per hour. Each time that the vehicle is refueled, the amount added to the tank may be referred to as the utilization or utilized fuel. Utilized fuel combined with the margin fuel may be referred to as a best level.

Fuel usage is more efficient if it is lighter. There are fuel savings, if the vehicle is lighter (e.g. there is less fuel in the tank). The vehicle is least efficient in fuel usage when the fuel tank is completely full, while the vehicle is most efficient in fuel usage when the fuel tank is an a minimal amount (e.g. the margin reserve level). The fuel usage rate (i.e. fuel burn rate or duty cycle) can be reflected in a profile. There may be different profiles that reflect the different fuel usage rates.

The usage of a vehicle may be classified into one or more fuel usage profiles. The fuel usage may be referred to as fuel burn rate or duty cycle. The profile may be based on the type and amount of usage, as well as where the vehicle is operated. For example, for a dump truck vehicle in a mine, the incline that the vehicle must traverse may be part of the profile. Further, the paths that a particular vehicle travels on can also determine the profile. For example, a very steep mine would result in a higher fuel usage rate. The profile may reflect an estimated fuel usage rate. The profile can be reset. The reset may be manually triggered by the user or may be reset based on usage (e.g. fuel utilization).

The profile may be dependent on the environment. In the example of a dump truck at a mine site, mine site operations may include changing haul profile assignments for a specific serial number truck based on production requirements and available individual trucks at a given schedule period. A truck operating for one week of time may be used for a high fuel usage haul path profile and then the next week of time, it may be used for a low fuel usage haul path profile. Accordingly, the haul path profile assignment must be flexible because it may be unpractical to physically exchange the tank to an optimum sized tank when the assignment of haul profile is done because of both spare parts costs and labor time costs. Accordingly, the optimal level (i.e. best level) for the consumable is calculated and maintained.

In one example, a vehicle may hold 1200 gallons of fuel. From the initial fueling, the vehicle is operated until the next refueling. The amount of that refueling may be referred to as the utilization level or utilized fuel. In one example, that amount of fuel is 700 gallons. At the next refueling time, the optimal level of fuel can be set as the utilization level combined with the margin level (e.g. 100 gallons). Accordingly, 800 gallons is the fueling level. Future refueling would be set at 800 gallons, however, the future utilization level may change with each iteration, so the 800 gallon optimal level may be adjusted based on usage. In one embodiment, the optimal level may require multiple iterations of a different amount for being reset. For example, multiple iterations of 500 gallons utilization would be required before the optimal level is changed from 800 gallons to 600 gallons (500 gallons plus 100 gallons for margin). In various embodiments, two iterations, three iterations, or more iterations may be logged before the optimal level is reset. Multiple iterations may be beneficial because there may be instances of unusual fuel usage (e.g. a truck sits and idles), so the optimal level should not be set based on those instances. Multiple iterations can help establish a pattern.

The present embodiments provide a refill method and system with machine behavior inputs which can result in obtaining an optimal reservoir level point for the refill actions. In one embodiment, the refill set point may be displayed for the optimum value. This refill set point can be either set manually or established iteratively by a controller algorithm and actuation mechanism. The resultant information can be provided in a human readable format, which may also be used directly with manual manipulation of alteration of the machine/vehicle. The resultant information may be used as a sensor input for a machine controller, which in turn provides outputs for machine adjustment mechanisms either directly or through plurality of other controllers. Another embodiment provides for the results to be displayed and/or used as a sensor input simultaneously by a controller for output actions which include indicators and logs and warnings which may be located on-vehicle and/or off-vehicle. Another embodiment provides for the results to be used for planning purposes for next required supply to the refill station location point, which in turn provides tool values for the optimizing of the haulage of other supply vehicles and/or for sourcing.

The vehicles, processes, displays, interfaces, and controllers described herein may be used for automating or optimizing the settings for replenishment of a consumable such as fuel. Specifically, the system allows for an optimum target vehicle configuration replenishment setting of a vehicle. This can be used to optimize the automated shutoff configuration of the replenishment system such that excessive amounts at the replenishment interval are reduced or eliminated from the vehicle's total mass. The functionality for optimizing the replenishment may be referred to as an automated fill level shutoff device that detects a level and stops replenishment at the optimum level.

The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present disclosure, and that the detailed description is not to be taken in a limiting sense, and that elements may be differently positioned, or otherwise noted as in the appended claims without requirements of the written description being required thereto.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

The aspects of the present disclosure may be described herein in terms of functional block components and various processing steps. It should be appreciated that such functional blocks may be realized by any number of hardware and/or software components configured to perform the specified functions. For example, these aspects may employ various integrated circuit components, e.g., memory elements, processing elements, logic elements, look-up tables, and the like, which may carry out a variety of functions under the control of one or more microprocessors or other control devices.

Similarly, the software elements of the present disclosure may be implemented with any programming or scripting languages such as C, C++, Java, COBOL, assembler, PERL, Python, or the like, with the various algorithms being implemented with any combination of data structures, objects, processes, routines, or other programming elements. Further, it should be noted that the present disclosure may employ any number of conventional techniques for data transmission, signaling, data processing, network control, and the like.

The particular implementations shown and described herein are for explanatory purposes and are not intended to otherwise be limiting in any way. Furthermore, the connecting lines shown in the various figures contained herein are intended to represent exemplary functional relationships and/or physical couplings between the various elements. It should be noted that many alternative or additional functional relationships or physical connections may be present in a practical incentive system implemented in accordance with the disclosure.

As will be appreciated by one of ordinary skill in the art, aspects of the present disclosure may be embodied as a method or a system. Furthermore, these aspects of the present disclosure may take the form of a computer program product on a tangible computer-readable storage medium having computer-readable program-code embodied in the storage medium. Any suitable computer-readable storage medium may be utilized, including hard disks, CD-ROM, optical storage devices, magnetic storage devices, and/or the like. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

FIG. 1 is a diagram of an example vehicle for refueling. Specifically, FIG. 1 illustrates an off-highway electric drive mining haulage dump truck 101. This is merely one example of a machine or vehicle that requires a consumable to be refilled. The refilling of the consumable can be optimized by ensuring significant consumable (without being over-consumed) while at the same time minimizing weight. As one example, the consumable may be fuel.

The vehicle 101 includes a fuel burning engine 102, which provides rotational shaft power to an electrical generation device 103, which in turn provides electrical energy through drive system controls 104. The drive system controls 104 direct the electrical energy to the wheel traction motor or motors 105 for propulsion. When the vehicle 101 is operated in conditions where retarding forces are required, such as downhill operations, rotational energy may be extracted from the wheel traction motor or motors 105 electrically through the drive system controls 104. The extracted electrical energy may be discharged to the ambient air through the drive system component retarding grid 106. Specific action by the operator in the operator controls station 107 may provide commands which could be mechanical, electrical, radio wave, or other transmitted signals. The commands may control the vehicle systems, such as the drive system controls 104, engine controls 108, and other systems controls 109 on the vehicle, whether directly or through drive system controls 104 and or possible other systems controls 109. Commands to the vehicle 101 may be received from external sources through wireless communication devices 110. An operator interface device or display 111 may be within the operator controls station 107. Data information from the vehicle 101 may be transmitted to external sources through wireless communication devices 110. The engine 102 receives fuel from fuel tank reservoir 112 on the vehicle 101. FIG. 2 (discussed below) further describes the fuel tank reservoir 112, which could be used for an off-highway mining truck application, such as the vehicle 101.

The optimization of fuel usage described herein may be utilized by vehicle 101. Specifically, the fuel tank reservoir 112 may be controlled to optimize the fuel level. The fuel tank refill settings may be displayed by the interface 111 and/or received/transmitted wirelessly to/from an external source via wireless communication 110.

FIG. 2a-2d illustrate example fuel reservoirs. Specifically, FIG. 2a-2d are example diesel fuel reservoirs for a vehicle, such as the mining haulage dump truck from FIG. 1. FIG. 2a illustrates a front view of an example fuel tank reservoir 201 for an off-highway mining truck 101. FIG. 2b illustrates a tank reservoir front view 202. FIG. 2c illustrates a tank reservoir side view 203. FIG. 2d illustrates tank reservoir top view 204. A mining truck tank reservoir 201 may include high volume fueling system components such as a quick connect receiver 205 for refuel delivery to the reservoir tank 201 and a shut-off pressure relief and venting valve 206. The venting valve 206 may allow for proper volumes of air to exit the tank at the large volume filling rate (e.g. a rate of fifty or more gallons per minute). When the level reaches the lower stem portion 207 of the venting valve 206 that is inserted into the tank 201 (which corresponds to the design specified full fuel level 208) the venting valve 206 then reduces the cross-sectional area for air escape. This provides a feedback pressure influence to the fueling inlet receiver 205, which in turn causes the source fueling nozzle to gain this pressure signal influence. This can cause cessation of the refueling flow of fuel into the tank. In the case of failure of the source fueling to stop the refueling flow of fuel into the tank as expected, the venting valve (in turn through a secondary valve relief spring mechanism) can open to prevent large pressurization of the tank. Opening can create a larger flow cross section for the fuel escape route, which can over rule the first shutoff reduction used for the pressure signal. This fueling method may be applicable to various applications where fuel is replenished from one reservoir to another. Once the provision that the set volume full amount is reached, then there may be a shut down of the fuel transfer without human required interaction, and without electrical components. In another embodiment, there may be a fuel level sensor 209 for measurement of the amount of fuel within the tank reservoir 201.

Figure 3:
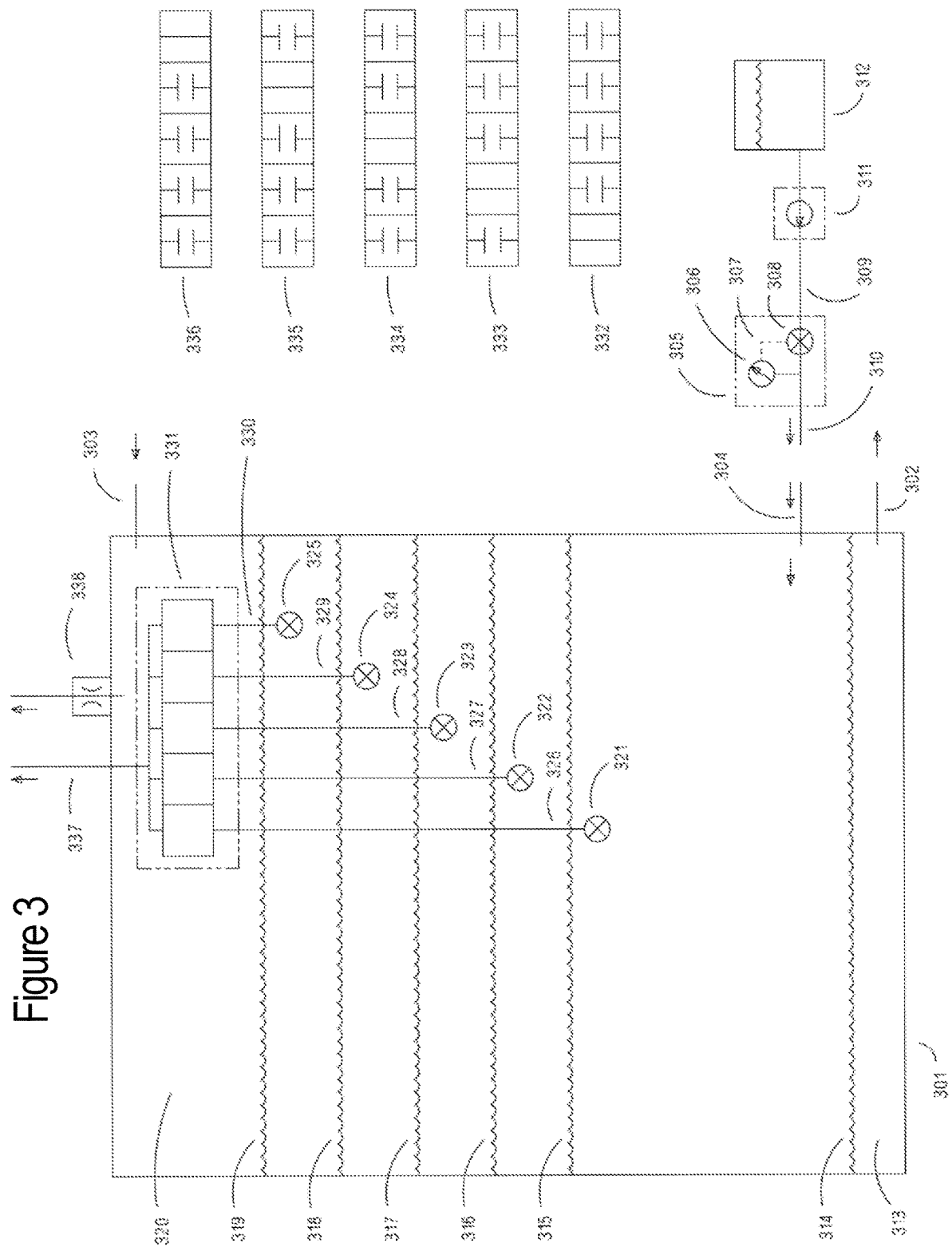
FIG. 3 is an example embodiment of a multiple level automatic fill shutoff (MLAFS) reservoir.

FIG. 3 is a schematic diagram example embodiment of a multiple level automatic fill shutoff (MLAFS) reservoir 301 for fuel. The MLAFS system one example of a fuel shutoff, which can be used for optimizing the fuel level. MLAFS is a mechanical mechanism for shutting off the fueling. In alternative embodiments, there may be a sensor (e.g. electrical sensor) which detects fuel levels or the fuel added to stop refueling at the optimal level. MLAFS or a sensor are examples of an automated fill level shutoff device, which controls when the replenishment is shut off to establish the fill level (e.g. fuel level). The automated fill level shutoff device may receive instructions from a controller for establishing the optimum fill level or may be set manually.

The supply line 302 and return line 303 are locations for the fuel reservoir 301 for an engine 102 in a vehicle 101. The replenish receiver 304 is an example of a receiver 205 (from FIG. 2). The replenish nozzle 305 includes mechanisms for auto shutoff such as a pressure sensor mechanism 306 which communicates along sensor path 307 for shutoff valve 308. Shutoff valve 308 is connected by supply line 309 to a supply source 312, which may also include a pump 311 in the supply line 309. The nozzle 305 includes a coupling fitting 310 for connection to receiver 304 at the time of a replenish operation. A minimum fuel level 314 may correspond to an amount of fuel required for reliable operation. The minimum fuel level 314 may establish an unusable fuel volume 313. Fuel levels 315, 316, 317, 318 and 319 represent the resultant shut-off fill levels corresponding to the functioning of vent shut off valves 321, 322, 323, 324 and 325 respectively. They each have corresponding different lengths extension lines 326, 327, 328, 329 and 330 respectively, which are connected to setting valve 331. The setting valve 331 includes example valve schematic depictions 332, 333, 334, 335 and 336, which include a corresponding vent path for their respective position to gain an escape path to the high volume escape 337 while simultaneously blocking the path for all other vent shut off valve paths. The top of the tank includes a high volume escape 337. When the tank is being fueled, the air volume 320 in the tank is being displaced. The displaced air passes through the high volume escape 337.

In this example embodiment, the number of levels is fixed and the volume for each level is fixed. Low volume breather escape 338 performs breather function for air volume 320 for non-replenishment operations. In alternative embodiments, the fuel levels may not be segmented or finite for shut-off and there may be a more accurate sensor that can shut off at much more specific fuel levels as opposed to the five fuel levels illustrated in the example of FIG. 3.

In one embodiment, the valve 331 may be single manifold with both electrical commanded and mechanically manually commanded mechanical mechanism such that a single path is only possible. In other embodiments, there may be multiple singular valves mechanical, electrical, and various others of single valves to obtain the requested single path air vent shut off function for a specific shut off level valve.

In another embodiment, a single vent valve path 326 may be constructed with a flexible hose and mechanism, which can be electrical or mechanically controlled for variable heights, which may or may not include valve 331 for other variable paths and corresponding heights. In other embodiments, there may be flexible joint tubing or combinations with hoses and mechanisms for similar singular and multiple adjustable ranges of levels. Other combinations for positional level settings may be used and there may be different levels than levels 315, 316, 317, 318 and 319 for the shut off valve. The control of the automated fill level shutoff device may be from a controller or processor that calculates the fill level (e.g. refuel level) such as according to FIG. 4.

Figure 4:
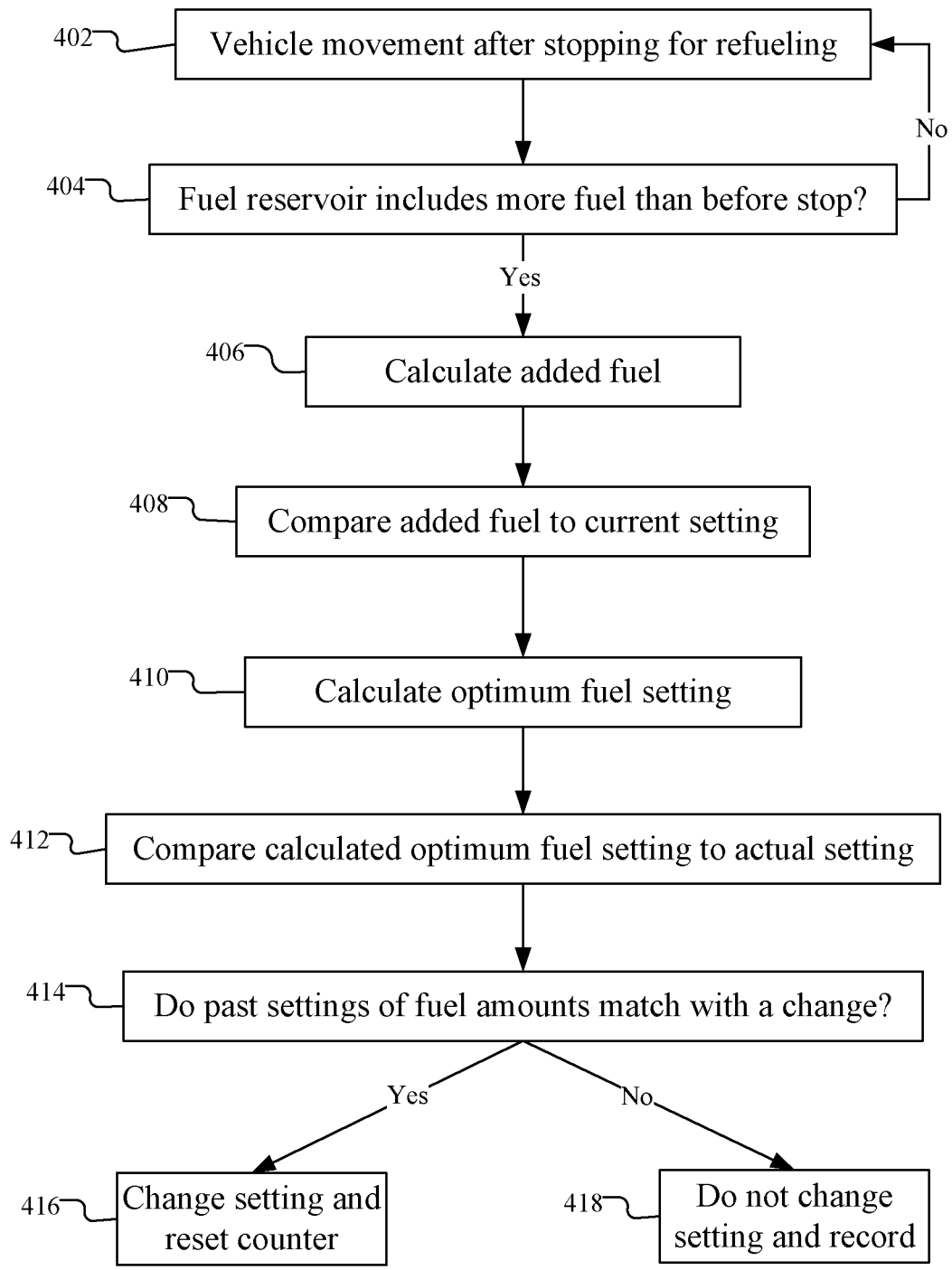
FIG. 4 is a flowchart for automatically setting the refuel level.

FIG. 4 is a flowchart for automatically setting the refuel level. In block 402, vehicle movement is detected after being stopped for enough time to allow refueling. In block 404, the fuel reservoir is checked to determine if it includes more fuel than before the stop. If the fuel reservoir is unchanged, then the process is returned to block 402 to wait for a stop. If the fuel reservoir is changed in block 404, then the added fuel is calculated in block 406. Specifically, the refueling adds fuel, which may be referred to as added fuel or a refuel amount. In block 408, the added fuel is compared to a current setting for the optimal refuel amount. In a first instance, the optimal refuel amount may be set manually by a user. In one embodiment, the automated system may require two or three iterations to reset the optimal refuel amount. The optimum fuel setting may be calculated in block 410. If the added fuel is comparable to the current setting in block 408, then there may be no change to the calculated optimum fuel setting in block 410. The comparison in block 408 is used along with stored log values of refuel amounts to calculate the optimum fuel setting in block 410. The calculated optimum fuel setting is then compared to the actual fuel setting in block 412 to determine if the current setting for refueling should be changed. The current setting may also be referred to as the actual setting and includes the current refuel amount for a vehicle. In block 414, the past settings of fuel amounts may be stored in a log and compared with the calculated optimum fuel setting to determine if a change is necessary. If the stored log values match with a change of the current refuel amount, then the refuel setting is changed and the counter is reset in block 416. The counter may require a certain number of iterations in the stored log values before actually resetting the refuel level. In one embodiment, three iterations may be required, so the counter would require three consecutive stored values of a refuel level before changing the optimum level. If the past settings of fuel amounts do not match with a change in block 414, then the refuel setting is not changed and the current setting is recorded in the log in block 418.

Figure 5:
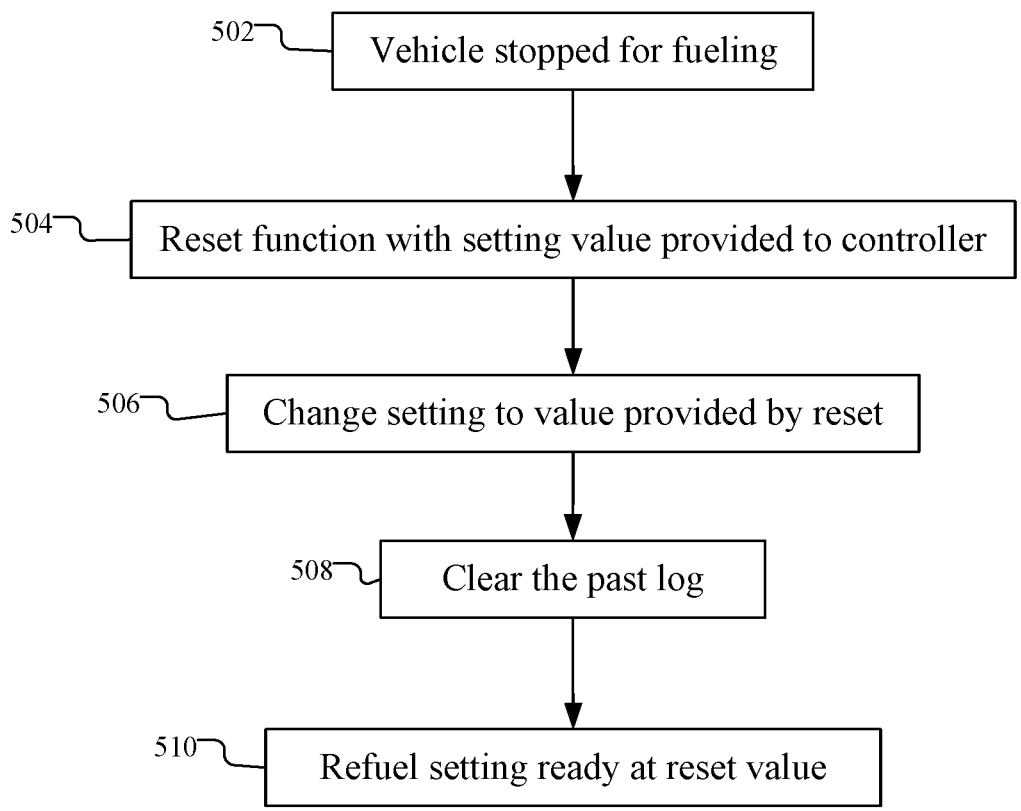
FIG. 5 is a flowchart for resetting the refuel level.

FIG. 5 is a flowchart for resetting the refuel level. In block 502, the vehicle is stopped for refueling. In block 504, the reset function with setting value is given to a controller. In block 506, the reset provides a new setting, which is set as the current setting. Upon the reset, the past log values are cleared in block 508. In block 510, the refuel setting is ready at the new setting level provided with the reset and the counter (iteration) is also reset.

Figure 6:
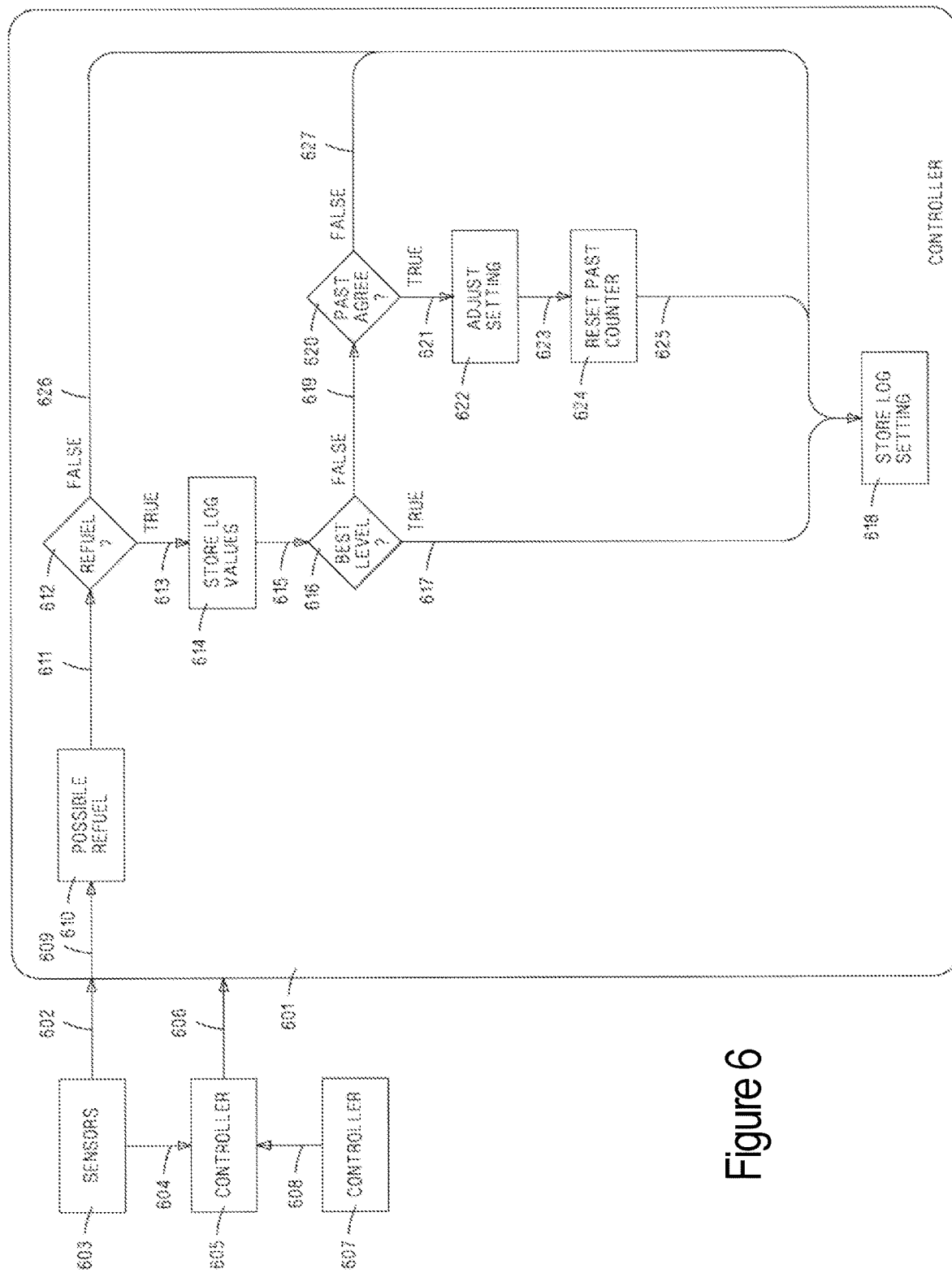
FIG. 6 is an example of controller operation.

FIG. 6 is an example of controller operation. A controller 601 may receive information directly along path 602 from various sensors 603 or may receive information indirectly through sensor signal path 604 to controller 605 through information path 606, or indirectly from another controller 607 through information path 608 to controller 605 through information path 606. The information provided to controller 601 may include any type of information related to the position of the truck or information from which the position of the truck can be determined, such as global positioning system (GPS) coordinates, GPS angles, radio direction signals, navigation device data, calculated angles or distances, etc. The information provided to controller 601 may include vehicle details including consumption amounts or rates of consumption of a fluid, substance, fuel, or other consumables. Sensors 603 and controllers 605 or 607 may be any type of sensor, controller, or device used to determine distances or positions, such as navigation devices, GPS devices, radar devices, steering sensors, speed sensors, radio sensors, etc. In other embodiments, sensors 603 and controllers 605 or 607 may provide consumption amounts or rates of consumption of a fluid, substance, fuel, or other consumable.

The controller 601 can take the information received along path 609 to block 610, possible refuel, where a determination is made as to whether conditions would allow for a possible refueling. Information from block 610 may be passed along path 611 to block 612 for determining whether to refuel. The information may be processed, derived, or raw data from the sensors 603, or from the controllers 605, 607. If block 612 results in a refuel, then path 613 proceeds with log values being stored in block 614. Specifically, the current condition vehicle values are stored such as volume amounts, and derived values from the raw values such as a target best refuel setting or other tank configuration settings. After storing the log values, path 615 leads to a decision as to the best level in block 616. The best level determination compares the storage log data obtained from the stored history values from block 614 with the current latest replenish values just received to determine whether the best target value derived from the latest replenish values corresponds to the current vehicle configuration settings, such as the replenish volume auto shutoff volume setting. If the current settings match with the stored log values, the best level is confirmed as true in path 617 and the current settings are then stored as log settings in block 618. Specifically, the current vehicle configuration settings, such as the replenish volume auto shutoff volume setting, are stored to the log. Since the best level was confirmed in block 616, no setting changes are needed because the current settings are the best level vehicle configuration settings. If the best level determination in block 616 is false, then path 619 starts a process by which the current settings are modified to the best level. Specifically, block 620 compares past values to see if the current settings/value compare with the past stored log values. The past agree block 620 may require a certain number of past iterations (e.g. 3 iterations) of the current setting before the best level is reset. In block 620, the algorithm can determine if the past iterations or past number of replenishments have continuously or consecutively targeted a better vehicle configuration setting value than the currently present configuration setting value on the vehicle. If true, then path 621 results in the setting being adjusted in block 622. In other words, the best level is redefined. Block 622 results in an adjustment to the configuration of the auto shut off replenishment setting for the reservoir that will allow for the next replenishment to advantage the calculated best level replenishment amount. In other embodiments, there may be a manual input setting (e.g. a switch or other input) in lieu of the automated setting of block 622. A manual setting could be for any of the possible setting values, including maximum and minimum settings.

After the setting is adjusted in block 622, path 623 results in the counter being reset in block 624. Block 624 clears memory values used for the past agree calculation (block 620). This causes the newly made vehicle setting to continue a predetermined number of replenishment cycles or iterations before an automated target level setting change can occur again. Path 625 after the past counter is reset in block 624 leads to the setting being stored in a log in block 618. If the past agree block 620 is false, then there will be no adjustment to the settings (because the past log values do not support a change) and path 627 then leads to the setting being stored in a log in block 618.

Figure 7:
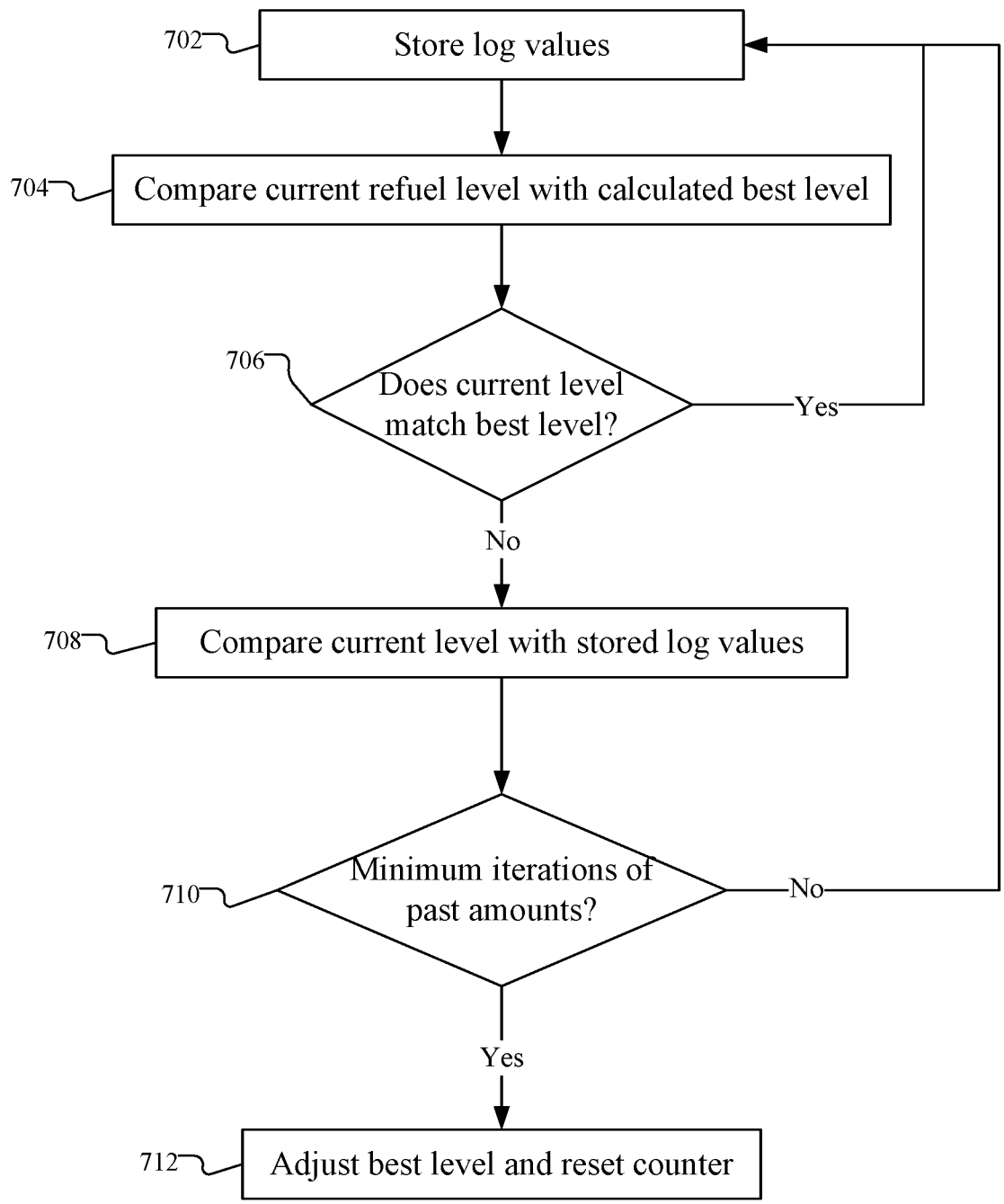
FIG. 7 is a flowchart of optimizing refueling.

FIG. 7 is a flowchart of optimizing refueling. In block 702, a refuel amount is stored in a log. Each refuel amount may be logged for future reference. The logged values may be referred to as past amounts. In block 704, the current refuel level (the current settings/amount of the refuel) is compared with the calculated best level. The calculated best level may be manually set initially or may be automatically adjusted based on usage. When the current refuel level matches the best level in block 706, the current refuel level is logged. When the current refuel level does not match the best level in block 706, the current level is compared with the stored log values in block 708. The matching comparison may be a determination that the amounts are similar. In other words, the amounts may not need to match exactly but could be similar, such as within a margin of error, such as within 1% of each other. Based on the comparison in block 708, if there are a minimum number of past amounts (stored in the log) that match or are similar to the current refuel level as in block 710, then the best level is adjusted and the counter is reset in block 712. The minimum number of iterations of past amounts may be variable. In one embodiment, the minimum may be two past amounts along with the current level to adjust the best level. In other words, there would be three consecutive refuel amounts that are used to reset the best level. The counter tracks the iterations of past amounts. In block 710, when there are not a minimum number of past amounts that match or are similar to the current level, the current level is stored as a log value.

Figure 8:
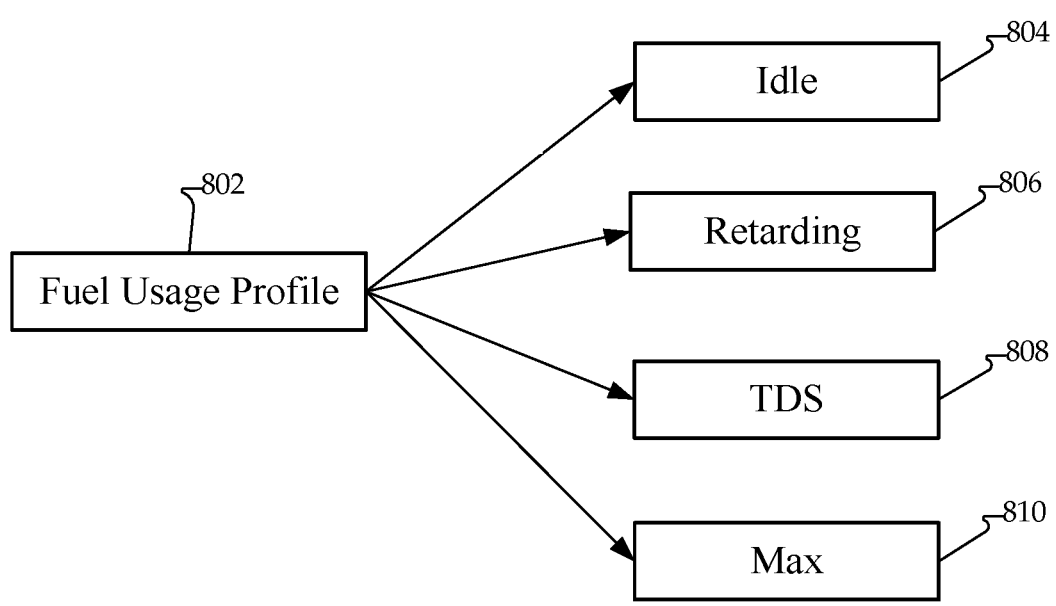
FIG. 8 is a diagram of example fuel usage profiles.

FIG. 8 is a diagram of example fuel usage profiles. Example profiles 802 include idle mode 804, retarding mode 806, turn dump spot (TDS) mode 808, or maximum mode 810. The idle mode 804 is when the vehicle is stationary, such as for loading or waiting. The retarding mode 806 is when the vehicle is slowing down. The TDS mode 808 is when the truck is turning, dumping, or spotting. Maximum mode 810 may include full speed operation or movement uphill or in a high fuel usage scenario. The gallons per hour (gph) being used for each mode/profile is different. In one example, the idle mode may be 2 gph, the retarding mode may be 3 gph, the TDS mode may be 44 gph, and the max mode may be 125 gph. The example values illustrate how the vehicle may use different fuel amounts for different operations or modes/profiles. Based on the different profiles, the best level for refueling or consumable replenishment may be different. Likewise, if a truck has its profile changed, then the corresponding optimal replenishment level will also be changed.

Figure 9:
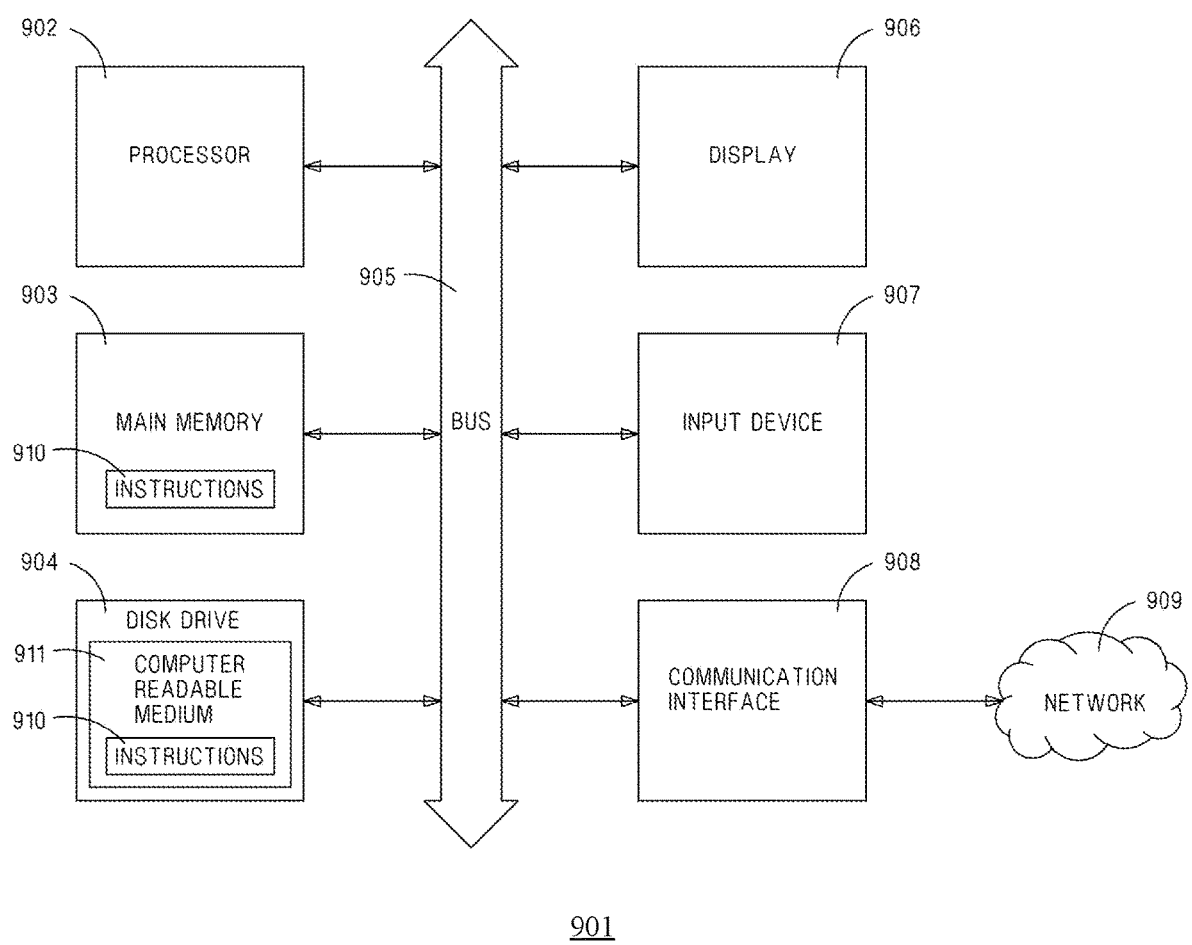
FIG. 9 is a diagram of an example controller.

FIG. 9 is a diagram of an example controller. Controller 901 is an exemplary controller that may be used for optimizing consumable usage. In one embodiment, controller 901 may be the controller 601 illustrated in FIG. 6 or the other controllers 605, 607. Controller 901 may be configured to run any of the vehicles, processes, or display interfaces as described in relation to all figures presented inclusively herein. The controller 901 may include a processor 902, such as, a central processing unit (CPU), a graphics processing unit (GPU), or combinations and variations of multiples of each. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as code generated manually, otherwise known as being programmed.

The controller 901 may include a memory 903 than can communicate via a bus 905. The memory 903 may be a main memory, a static memory, or a dynamic memory. The memory 903 may include, but may not be limited to computer readable storage media such as various types of volatile and non-volatile storage media, including but not limited to random access memory, read only memory, programmable read-only memory, electrically programmable read-only memory, electrically erasable read-only memory, flash memory, magnetic tape or disk, optical media and the like. In one case, the memory 903 may include a cache or random-access memory for the processor 902. Alternatively, or in addition, the memory 903 may be separate from the processor 902, such as a cache memory of a processor, the system memory, or other memory. The memory 903 may be an external storage device or database for storing data. Examples may include a hard drive, compact disc (CD), digital video disc (DVD), memory card, memory stick, floppy disc, universal serial bus (USB) memory device, or any other device operative to store data. The memory 903 may be operable to store instructions 910 executable by the processor 902. The functions, processes, acts or tasks illustrated in the figures or described herein may be performed by the programmed processor 902 executing the instructions 910 stored in the memory 903. Alternatively, or in addition the instructions 910 for carrying out the functions, process, acts or tasks described herein may be embedded in hardware, software, or some combination of both, such as read only memory (ROM) in the controller. The functions, processes, acts or tasks may be independent of the instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The controller unit 901 may further include, or be in communication with, a display 906, such as a liquid crystal display (LCD), an organic light emitting diode (OLED), a flat panel display, a solid-state display, a cathode ray tube (CRT), a projector, a printer or other now known or later developed display device for outputting determined information. The display 906 may operate similarly to the display embodiments described herein. The display 906 may act as an interface for the user to see the functioning of the processor 902, or specifically as an interface with the software or instructions 910 stored in the memory 903 or in the drive unit 904.

Additionally, the controller unit 900 may include, or be in communication with an input device 907 configured to allow a user to interact with any of the components of controller unit 901. The input device 907 may be a number pad, a keyboard, or a cursor control device, such as a mouse, or a joystick, touch screen display, remote control or any other device operative to interact with the controller unit 901. The input device 907 may be part of the display 906.

The controller unit 901 may also include a disk or optical drive unit 904. The disk drive unit 904 may include a computer readable medium 911 in which one or more sets of instructions 910, also known as software, can be embedded. Further, the instructions 910 may perform one or more of the methods or logic as described herein. The instructions 910 may reside completely, or at least partially, within the memory 903 and or within the processor 902 during execution by the controller unit 901. The memory 903 and the processor 902 also may include computer readable media as discussed above.

The present disclosure contemplates a computer readable medium 911 that includes instructions 910 or receives and executes instructions 910 responsive to a propagated signal; so that a device connected to a network 909 may communicate voice, video, audio, images or any other data over the network 909. Further, the instruction 910 may be transmitted or received over the network 909 via a communication interface 908. The communication interface 908 may be a part of the processor 902 or may be a separate component. The communication interface 908 may be created in software or may be a physical connection in hardware. The communication interface 908 may be configured to connect with a network 909, additional devices, external media, the display 906, or any other components in controller unit 901, or combinations thereof. The connection with the communication interface 908 may be physical connection, such as a serial interface RS-232 connection, wired Ethernet connection, wireless connection as discussed below, or any other type of connection. Likewise, the additional connections with other components of the controller unit 901 may be physical connections or may be established wirelessly.

The network 909 may include additional devices used in conjunction with wired networks, wireless networks, or combinations thereof. The wireless network may be a cellular telephone network, an 802.11, 802.16, 802.20, or WiMax network. Further, the network 909 may be a public network, such as the Internet, a private network, such as an intranet, or combinations thereof, and may utilize a variety of networking protocols now available or later developed including, but not limited to TCP/IP based networking protocols, encrypted messaging and authentications, dual key encryptions, and others both readily known and future derivations.

The computer readable medium 911 may be a single medium, or the computer readable medium 911 may be multiple media, such as a centralized or distributed database, associated cashes and servers that store one or more sets of instructions. The term computer readable medium may also include any medium capable of storing, encoding or carrying a set of instructions for execution by a processor or that may cause a computer system to perform any one or more of the methods or operations disclosed herein.

The computer readable medium 911 may include a solid-state memory such as a memory card or other package that houses one or more non-volatile read-only memories. The computer readable medium 911 also may be a random-access memory or other volatile re-writable memory. Additionally, the computer readable medium 911 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer readable medium or distribution medium and other equivalents and successor media, in which data or instructions may be stored.

The system and process described above may be encoded in a signal bearing medium, a computer readable medium such as a memory, programmed within a device such as one or more integrated circuits, one or more processors or processed by a controller or a computer. If the methods are performed by software, the software may reside in a memory resident to or interfaced to a storage device, a communication interface, or non-volatile or volatile memory in communication with a transmitter. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A method for adjusting a replenishment of a consumable to a vehicle, the method comprising:
   recording past amounts for the replenishment of the consumable;
   determining an optimal replenishment amount based on the recorded past amounts;
   comparing a current replenishment amount with the optimal replenishment amount;
   comparing, when the current replenishment amount is different from the optimal replenishment amount, the current replenishment amount with the recorded past amounts;
   adjusting the optimal replenishment amount when the current replenishment amount matches at least one of the recorded past amounts; and
   recording the current replenishment amount without adjustment to the optimal replenishment amount when the current replenishment amount matches the optimal replenishment amount.

2. The method of claim 1, further comprising:
   maintaining a counter for the recorded past amounts, wherein the adjusting is performed with the counter is above a minimum number of iterations.

3. The method of claim 2, wherein the minimum number of iterations comprises three recorded past amounts.

4. The method of claim 1, further comprising:
   adjusting a current replenishment amount for the consumable based on the comparison.

5. The method of claim 1, wherein the consumable comprises fuel and the replenishment comprises refueling.

6. The method of claim 5, wherein the vehicle includes a fuel reservoir that is replenished.

7. The method of claim 6, wherein the optimal replenishment amount is less than a maximum amount of fuel that the reservoir can hold.

8. The method of claim 6, wherein the reservoir comprises a diesel fuel tank, the vehicle comprises a mining haulage dump truck, and replenishment comprises an automated fill level shutoff device.

9. The method of claim 6, wherein the reservoir comprises a diesel emissions fluid (DEF) tank, the vehicle comprises a mining haulage dump truck, and replenishment comprises an automated fill level shutoff device.

10. The method of claim 5, further comprising:
    setting the optimal replenishment amount based on a fuel usage profile of the vehicle.

11. A method for adjusting a replenishment volume of material to a vehicle, the method comprising:
    determining a volume of at least one previous replenishment;
    determining an optimal reservoir volume that corresponds to the at least one of the previous replenishments;
    initiating automatic control of the vehicle reservoir to adjust a current replenishment volume; and
    adjusting the optimal reservoir volume based on a comparison of the current replenishment volume with the optimal reservoir volume and a comparison with the previous replenishment volumes.

12. The method of claim 11, wherein the material comprises fuel.

* * * * *